(12) United States Patent
Zhang et al.

(10) Patent No.: US 12,273,172 B2
(45) Date of Patent: *Apr. 8, 2025

(54) CHANNEL STATE INFORMATION REPORT FOR PHASE TRACKING REFERENCE SIGNAL PORT SELECTION

(71) Applicant: Apple Inc., Cupertino, CA (US)

(72) Inventors: Yushu Zhang, Beijing (CN); Victor Sergeev, Nizhny Novgorod (RU); Guotong Wang, Beijing (CN); Alexei Davydov, Nizhny Novgorod (RU); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,883

(22) Filed: Aug. 4, 2023

(65) Prior Publication Data

US 2023/0412229 A1    Dec. 21, 2023

Related U.S. Application Data

(63) Continuation of application No. 17/199,901, filed on Mar. 12, 2021, now Pat. No. 11,757,512, which is a continuation of application No. 16/172,602, filed on Oct. 26, 2018, now Pat. No. 10,951,290, which is a continuation of application No.
(Continued)

(51) Int. Cl.
| | |
|---|---|
| *H04W 24/10* | (2009.01) |
| *H04B 7/0408* | (2017.01) |
| *H04B 7/06* | (2006.01) |
| *H04L 1/00* | (2006.01) |
| *H04L 1/1812* | (2023.01) |
| *H04L 5/00* | (2006.01) |
| *H04W 72/23* | (2023.01) |

(Continued)

(52) U.S. Cl.
CPC ........ *H04B 7/0626* (2013.01); *H04B 7/0408* (2013.01); *H04B 7/0632* (2013.01); *H04B 7/0639* (2013.01); *H04L 1/0026* (2013.01); *H04L 1/1812* (2013.01); *H04L 5/0048* (2013.01); *H04W 72/23* (2023.01); *H04W 76/27* (2018.02); *H04L 1/0031* (2013.01); *H04L 1/1671* (2013.01); *H04L 5/005* (2013.01); *H04L 5/0051* (2013.01); *H04L 5/0057* (2013.01)

(58) Field of Classification Search
None
See application file for complete search history.

(56) References Cited

U.S. PATENT DOCUMENTS 9,231,809 B2    1/2016   Azizi et al.
9,930,651 B2 *  3/2018   Guo ..................... H04L 5/0053
(Continued)

*Primary Examiner* — Sithu Ko
(74) *Attorney, Agent, or Firm* — Sterne, Kessler, Goldstein & Fox P.L.L.C.

(57) ABSTRACT

Described is an apparatus of a User Equipment (UE) operable to communicate with an Evolved Node-B (eNB) on a wireless network. The apparatus may comprise a first circuitry and a second circuitry. The first circuitry may be operable to process a Downlink (DL) transmission carrying one or more Phase Tracking Reference Signal (PT-RSes). The second circuitry may be operable to generate an Uplink (UL) transmission carrying a Layer Indicator (LI) based at least on a number of PT-RS Antenna Ports (APs) associated with the PT-RSes.

19 Claims, 8 Drawing Sheets

Related U.S. Application Data

PCT/CN2017/109521, filed on Nov. 6, 2017, and a continuation of application No. PCT/CN2017/107898, filed on Oct. 26, 2017.

(60) Provisional application No. 62/584,625, filed on Nov. 10, 2017.

(51) Int. Cl.
*H04W 76/27* (2018.01)
*H04L 1/1607* (2023.01)

(56) References Cited

U.S. PATENT DOCUMENTS

| | | | |
|---|---|---|---|
| 10,200,103 B2* | 2/2019 | Rahman | H04B 7/0478 |
| 10,404,347 B2* | 9/2019 | Zhang | H04B 7/0628 |
| 10,447,319 B1 | 10/2019 | Lee et al. | |
| 10,659,119 B2 | 5/2020 | Li et al. | |
| 2014/0192917 A1 | 7/2014 | Nam et al. | |
| 2014/0269395 A1* | 9/2014 | Chen | H04L 43/50 370/252 |
| 2015/0023199 A1* | 1/2015 | Ishida | H04W 80/02 370/252 |
| 2015/0156767 A1 | 6/2015 | Yin et al. | |
| 2016/0337056 A1 | 11/2016 | Frenne et al. | |
| 2016/0365993 A1 | 12/2016 | Chen et al. | |
| 2017/0302495 A1 | 10/2017 | Islam et al. | |
| 2018/0041259 A1* | 2/2018 | Kim | H04L 25/0204 |
| 2018/0070351 A1* | 3/2018 | Ko | H04B 7/0413 |
| 2018/0077603 A1 | 3/2018 | John Wilson et al. | |
| 2018/0123653 A1 | 5/2018 | Wang et al. | |
| 2018/0175993 A1* | 6/2018 | Onggosanusi | H04L 5/0057 |
| 2018/0287759 A1 | 10/2018 | Kundargi et al. | |
| 2018/0323840 A1 | 11/2018 | Nammi et al. | |
| 2018/0331804 A1 | 11/2018 | Hessler et al. | |
| 2019/0068268 A1 | 2/2019 | Zhang et al. | |
| 2019/0312697 A1 | 10/2019 | Li et al. | |
| 2019/0326964 A1 | 10/2019 | Li et al. | |
| 2019/0341950 A1* | 11/2019 | Lee | H04L 5/0048 |

* cited by examiner

CHANNEL STATE INFORMATION REPORT FOR PHASE TRACKING REFERENCE SIGNAL PORT SELECTION

CLAIM OF PRIORITY

The present application is a continuation of U.S. patent application Ser. No. 17/199,901, filed Mar. 12, 2021, which is continuation of U.S. patent application Ser. No. 16/172,602, filed Oct. 26, 2018, which claims priority under 35 U.S.C. § 365 to Patent Cooperation Treaty International Patent Application Number PCT/CN20171107898 filed Oct. 26, 2017 and entitled "CHANNEL STATE INFORMATION (CSI) REPORT FOR PHASE TRACKING REFERENCE SIGNAL (PT-RS) PORT SELECTION," and claims priority under 35 U.S.C. § 365 to Patent Cooperation Treaty International Patent Application Number PCT/CN2017/109521 filed Nov. 6, 2017 and entitled "BEAM REPORTING AND CHANNEL STATE INFORMATION (CSI) REPORTING WITH DEFAULT BEAM IN NEW RADIO (NR) SYSTEMS," and claims benefit under 35 U.S.C. § 119 to U.S. Provisional Patent Application Ser. No. 62/584,625 filed Nov. 10, 2017 and entitled "TRIGGERING MECHANISMS AND COLLISION HANDLING OF CHANNEL STATE INFORMATION (CSI) AND BEAM RELATED INFORMATION FOR NEW RADIO (NR) SYSTEMS," all of which are incorporated herein by reference in their entireties.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Next-generation wireless cellular communication systems may provide support for higher bandwidths in part by supporting Phase-Tracking Reference Signals (PT-RSes).

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
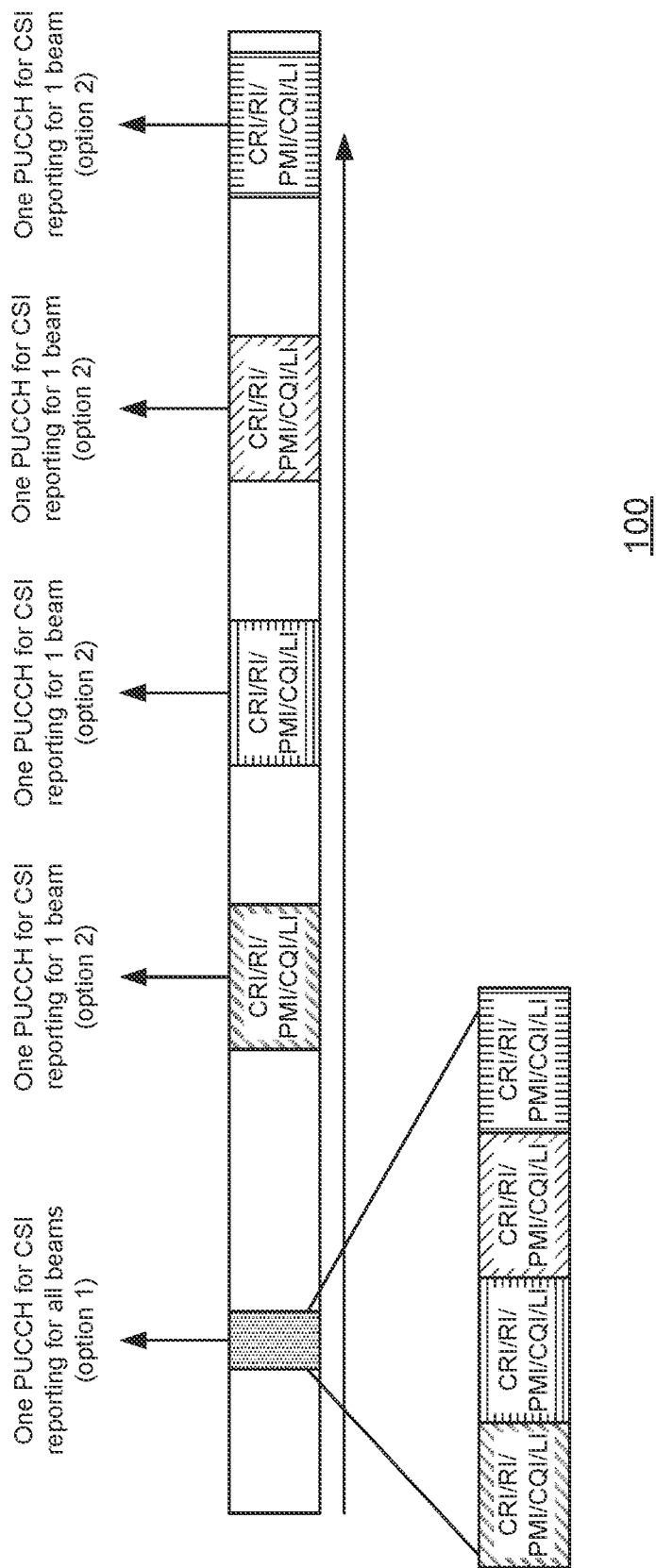
FIG. 1 illustrates a scenario of reporting of multiple Layer Indicators is), in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems 5G New Radio (NR) systems.

Mobile communication has evolved significantly from early voice systems to today's highly sophisticated integrated communication platforms. 5G systems and NR systems may provide access to information and sharing of data in a wide variety of places at a wide variety of times for various users and applications. NR systems may support unified networks targeted to meet vastly different and sometimes conflicting performance dimensions and services. Such diverse multi-dimensional features may be driven by different services and applications. In general, NR may represent an evolution based on 3GPP LTE-A with additional potential new Radio Access Technologies (RATs) to provide users with better, simpler, and seamless wireless connectivity solutions. NR may enable ubiquitous data to users connected by wireless networks and may deliver fast, rich contents and services.

With respect to a first variety of embodiments, for a system operating in a high frequency band (e.g., 6 Gigahertz (GHz) or more), a Phase Tracking Reference Signal (PT-RS) may be used to compensate for a phase shift caused by phase noise. The PT-RS may be associated with an Antenna Port (AP) of a Demodulation Reference Signal (DMRS) AP group. A 5G-capable or NR-capable Evolved Node-B (gNB) may apply a most-preferable or most-suitable precoder for an AP in order to get the best performance. In that case, some User Equipment (UE) feedback may be provided for the gNB to derive the precoder for the PT-RS. In this regard, the UE may report its desired layer index in association with a Channel State Information (CSI) report. How to report a Layer indicator (LI) with CSI may then be an issue.

Accordingly, disclosed herein are methods and mechanisms for reporting LI. Some embodiments may pertain to different numbers of PT-RS APs. Some embodiments may pertain to CSI reports based on Physical Uplink Control Channel (PUCCH) and/or Physical Uplink Shared Channel (PUSCH).

With respect to a second variety of embodiments, in a 5G system and/or NR system, a gNB and a UE may use a default, pre-defined, pre-configured, rule-based, or otherwise predetermined beam for Physical Downlink Shared Channel (PDSCH) if a corresponding scheduling delay is smaller than a certain threshold. Accordingly, the maintenance of the default beam may be significant.

In some embodiments, the UE may be disposed to report beam quality for a default beam Moreover, the gNB may determine whether the default beam should be updated or not. For some embodiments, the UE may exclude a default beam from beam reporting if a quality of the default beam is poor, which could be implicitly interpreted as a request to update the default beam.

In some embodiments, if there is collision between beam reporting and CSI reporting, a system may be disposed to drop one of them. One criterion to decide which one to drop may be whether the default beam should be updated or not.

Accordingly, disclosed herein are methods and mechanisms for beam reporting and CSI reporting considering a default beam.

With respect to a third variety of embodiments, for NR, Uplink Control information (UCI) may include Scheduling Request (SR), Hybrid Automatic Repeat Request Acknowledgement (HARQ-ACK) feedback, CSI report (e.g., Channel Quality Indicator (CQI), Pre-coding Matrix Indicator (PMI), CSI Resource Indicator (CRI), and/or Rank Indicator (RI)), and/or beam related information (e.g., Layer 1 Reference Signal Received Power (LI-RSRP)).

Furthermore, NR may support PUCCH with short duration and/or long duration. A short PUCCH may span one or two symbols while a long PUCCH may span any number of symbols (e.g., from 4 to 14 within a slot).

For beam-related information reporting, LI-RSRP and/or beam resource indicators reporting for beam management may be carried by PUCCH with short duration and long duration and/or PUSCH.

One or more of the following physical channels may be used to carry beam related information reporting (depending on specific type of information reported). For periodic beam related information reporting, short PUCCH and/or long PUCCH may be used. For semi-persistent beam related information reporting, short PUCCH, long PUCCH, and/or PUSCH may be used. For aperiodic beam related information reporting, short PUCCH and PUSCH may be used.

Given that short PUCCH, long PUCCH, and/or PUSCH may be used to carry beam related information reporting, detailed triggering mechanisms may be defined to schedule the transmission of PUCCH and PUSCH. Furthermore, a beam related information report may collide with other physical channels or signals, and in such cases, certain dropping rules or priority rules may need to be defined to allow a UE to drop one of the physical channels/signals (e.g., in order to alleviate Intermodulation Distortion (IMD) issues).

Accordingly, discussed herein are methods and mechanisms for triggering beam related information reporting. Some embodiments may pertain to triggering mechanisms for beam related information reporting. Some embodiments may pertain to collision handling in cases in which beam related information reporting collides with other physical channel and signals.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within ±1-10% of a target value. Unless otherwise specified the use of the ordinal adjectives "first," "second," and "third." etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point, anchor another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

With respect to a first variety of embodiments, some embodiments may pertain to and CSI reporting based on PUCCH. CSI including CRI, RI, PMI and/or CQI may be reported by short PUCCH or long PUCCH, where the CRI, RI, PMI and CQI may be jointly encoded, or may be separately encoded with some padding.

Furthermore, a number of codewords (CW) may be derived from the higher layer configuration of a number of Modulation and Coding Schemes (MCS) in Downlink Control Information (DCI). If the number of CWs is 2, the reported U may be selected from the layers for the CW with largest CQI.

In some embodiments, if the number of PT-RS APs is 1 and the maximum number of CW is 1, the LI may be jointly encoded with at least one of CRI, RI, PMI, and/or CQI. For some embodiments, the LI may be jointly encoded with CRI, RI, PMI, and/or CQI. In some embodiments, the LI may be jointly encoded with RI. For some embodiments, the LI may be jointly encoded with PMI.

Alternatively, the LI may can be independently reported, and some padding may be added to keep a total payload size constant for all cases. For example, if the maximum rank for one CRI is 2, for rank 1 transmission, no LI might be reported, and for rank 2 transmission, a 1 bit LI might be reported. So, to keep the payload size constant, for rank 1 transmission, 1 padding bit may be used.

In some embodiments, for long PUCCH for subband CSI reporting, the LI may be jointly encoded with a second CSI part for PMI/CQI feedback (which may be similar to the LI report in PUSCH as shown in Table 3 below).

For some embodiments, if a number of PT-RS APs is 1 and a maximum number of CW is 2, the schemes disclosed herein may also be used. Furthermore, the LI may be jointly encoded with the CQI, Alternatively, the indication of LI may be determined by the value of CQI. Table 1 below illustrates one example for the LI indication for independent coding.

TABLE 1

An example of LI indication for independent coding

| RI | LI (3 bits) | LI Indication |
|---|---|---|
| 0 | 000-111 | No LI, just padding |
| 1 | 000 | Layer 0 |
|   | 001 | Layer 1 |
|   | 001-111 | padding |
| 2 | ... | ... |
| 3 | ... | ... |
| 4 | 000 | If CQI1 > CQI0, Layer 0 of CW 1; otherwise layer 0 of CW 0 |
|   | 001 | If CQI1 > CQI0, Layer 1 of CW 1; otherwise layer 1 of CW 0 |
|   | 010 | If CQI1 > CQI0, Layer 2 of CW 1; otherwise padding |
|   | 011-111 | padding |
| 5 | ... | ... |
| 6 | ... | ... |
| 7 | ... | ... |

Table 2 below illustrates one example for joint coding of RI and LI.

TABLE 2

An example for joint RI and LI encoding

| Rank and Layer Indicator | RI | LI |
|---|---|---|
| 0 | 0 | — |
| 1 | 1 | 0 |
| 2 | 1 | 1 |
| 3 | 2 | 0 |
| 4 | 2 | 1 |
| 5 | 2 | 2 |
| 6 | 3 | 0 |
| 7 | 3 | 1 |
| 8 | 3 | 2 |
| 9 | 3 | 3 |
| 10 | 4 | If CQI1 > CQI0, Layer 0 of CW 1; otherwise laver 0 of CW 0 |
| 11 | 4 | If CQI1 > CQI0, Layer 1 of CW 1; otherwise layer 1 of CW 0 |
| 12 | 4 | If CQI1 > CQI0, Layer 2 of CW 1; otherwise no indication of LI |
| 13 | 5 | If CQI1 > CQI0, Layer 0 of CW 1; otherwise layer 0 of CW 0 |
| 14 | 5 | If CQI1 > CQI0, Layer 1 of CW 1; otherwise layer 1 of CW 0 |
| ... | ... | ... |

TABLE 3

An example of LI indication when reported
in the second part, hen a value of LI = x

| Value of RI | LI payload size and indication |
|---|---|
| 0 | 0 bit LI |
| 1 | 1 bit LI, layer index = x − 1 |
| 2 | 2 bit LI, layer index = x − 1 and only x <= 2 is valid |
| 3 | 2 bit LI, layer index = x − 1 |
| 4 | 2 bit LI, If CQI1 > CQI0 and x <= 2, Layer x − 1 of CW 1; If CQI1 <= CQI0 and x <= 1, layer x − 1 of CW 0, other cases are not valid |
| 5 | 2 bit LI, If CQI1 > CQI0 and x <= 2, Layer x − 1 of CW 1; If CQI1 <= CQI0 and x <= 2, layer x − 1 of CW 0, other cases are not valid |
| 6 | 2 bit LI, If CQI1 > CQI0, Layer x − 1 of CW 1; If CQI1 <= CQI0 and x <= 2, layer x − 1 of CW 0, other cases are not valid |
| 7 | 2 bit LI, If CQI1 > CQI0, Layer x − 1 of CW 1; If CQI1 <= CQI0, layer x − 1 of CW 0 |

In some embodiments, a number of LI may be determined by a number of PT-RS APs and/or RI. If the number of PT-RS APs is N, then N LIs may be reported. The N LI may be separately encoded and some padding may be used to keep the same payload size for all cases. Alternatively, the N LI may be jointly encoded with at least one of CRI, RI, PMI, and CQI. Furthermore, one LI may be reported per CRI.

The following options may then be used to report the CSI. In an option 1, CSI for all beams may be reported by one PUCCH time/frequency resource. In an option 2, CSI for a sub-set of beams may be reported by one PUCCH time/frequency resource.

FIG. 1 illustrates a scenario of reporting of multiple LIs, in accordance with some embodiments of the disclosure. A scenario 100 comprises CSI reporting in accordance with option 1 and option 2.

Some embodiments may pertain to LI and CSI reporting based on PUSCH. CSI reported by PUSCH may be divided into two parts, Part 1 may include CRI, RI, and/or a first CQI, while part 2 may include PMI and a second CQI. A bitwidth for LI in part 2 may be determined by a reported RE in part 1.

In some embodiments, if one PT-RS AP is used, LI may be jointly encoded with CRT, RI, the first CQI, PMI, and/or the second CQI. Alternatively, LI may be transmitted in the second part. The payload size of LI may then be determined by a value of RI in the first part. The LI indication may be in accordance with Table 3 above.

For some embodiments, if N PT-RS APs are used, N LI may be reported. The N LI may be jointly encoded with CRT, RI, the first CQI, PMI, and/or the second CQI. Alternatively, the N LI may be independently encoded with the second part. One LI can be reported per CRT. The N LI may be reported by one or more PUSCH time/frequency resources. Methods and mechanisms similar to those depicted in FIG. 1 (and above) may be used.

Alternatively, the N LI may be jointly encoded, and RI may be jointly encoded as well. Table 4 below illustrates one example for the joint encoding of 2 LI and RI.

TABLE 4 an example for Joint coding of RI and
2 LI if number of DMRS group = 2

| Rank and Layer Indicator | RI | LI1 | LI2 |
|---|---|---|---|
| 0 | 0 | — | — |
| 1 | 1 | 0 | 1 |
| 2 | 2 | 0 | 2 |
| 3 | 2 | 1 | 2 |
| 4 | 2 | 0 | 1 |
| 5 | 3 | 0 | 2 |
| 6 | 3 | 0 | 3 |
| 7 | 3 | 1 | 2 |
| 8 | 3 | 1 | 3 |

Some embodiments may pertain to Uplink (UL) PT-RS AP indication. For UL, one or more PT-RS APs may be used. A system may then be disposed to indicating the Quasi Co-Location (QCL) of PT-RS and one DMRS AP in a DMRS group.

In some embodiments, the QCL indication of PT-RS APs may be independently indicated, or may be jointly encoded with at least one of a Transmit RI (TRI), a Transmit PMI (TPMI), and/or a Sounding Reference Signal (SRS) Resource Index (SRI). Table 4 provides an example of an indication of the QCL, or association, of PT-RS AP when a number of DMRS groups is 2 by changing LI into QCL. Table 5 below provides an example of an indication of the QCL of PT-RS AP when a number of DMRS groups is 1. For non-codebook transmission, the QCL and SRI may be jointly indicated, and the number of candidate AP of DMRS to be QCLed can be determined by the number of SRS resources.

TABLE 5 an example of Joint TRI and QCL indication

| Rank and PT-RS QCL | TRI | QCL between PT-RS and DMRS |
|---|---|---|
| 0 | 0 | PT-RS is QCLed with DMRS AP 0 |
| 1 | 1 | PT-RS is QCLed with DMRS AP 0 |
| 2 | 1 | PT-RS is QCLed with DMRS AP 1 |
| 3 | 2 | PT-RS is QCLed with DMRS AP 0 |
| 4 | 2 | PT-RS is QCLed with DMRS AP 1 |
| 5 | 2 | PT-RS is QCLed with DMRS AP 2 |
| 6 | 3 | PT-RS is QCLed with DMRS AP 0 |
| 7 | 3 | PT-RS is QCLed with DMRS AP 1 |
| 8 | 3 | PT-RS is QCLed with DMRS AP 2 |
| 9 | 3 | PT-RS is QCLed with DMRS AP 3 |

With respect to a second variety of embodiments, some embodiments may pertain to beam reporting with a default beam. A gNB and a UE may use a default pre-defined, pre-configured, rule-based, or otherwise predetermined beam for POSCH and/or Physical Downlink Control Channel (PDCCH) if the scheduling delay is smaller than a certain threshold. As a result, maintenance of the default beam may be advantageous.

A UE may report the quality of the default beam so that a gNB may know the status of the default beam. The UE may be configured to report the default beam periodically, or semi-persistently, or aperiodically. The UE may report the beam index of the default beam and LI-RSRP. In order to reduce overhead, the UE may merely report LI-RSRP for the default beam. After receiving the LI-RSRP of the default beam, the gNB may determine whether the default beam should be updated. The gNB may also signal to the UE information regarding the default beam, if it has been changed.

Figure 2A:
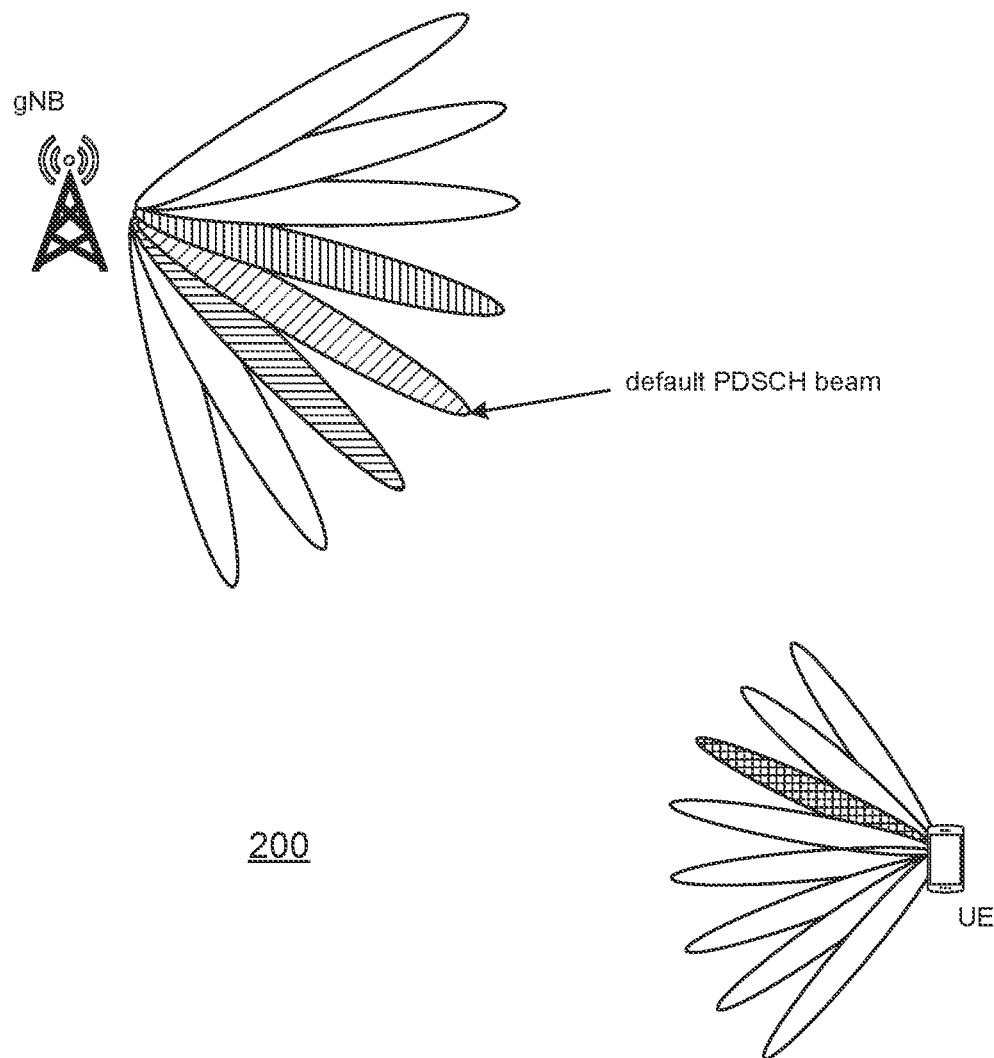
FIGS. 2A-2B illustrate scenarios of beam reporting with a default Physical Downlink Shared Channel (PDSCH) beam, in accordance with some embodiments of the disclosure.
Figure 2B:
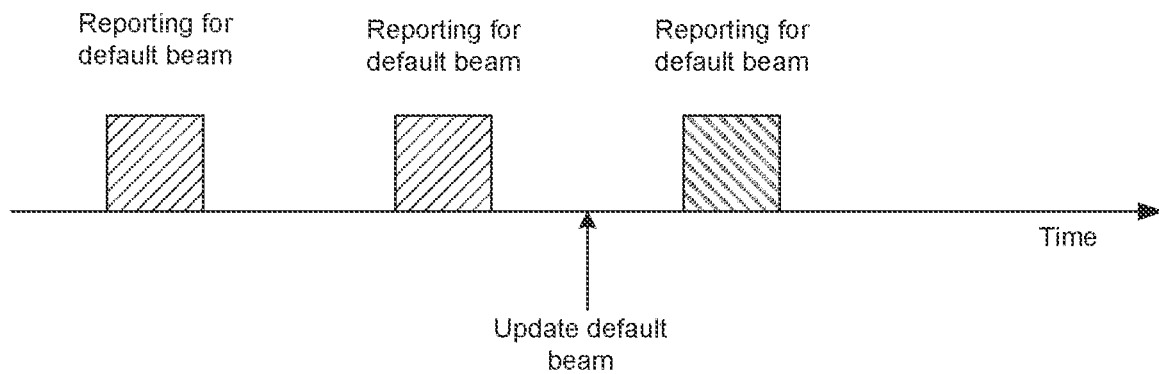

FIGS. 2A-2B illustrate scenarios of beam reporting with a default PDSCH beam, in accordance with some embodiments of the disclosure. A scenario 200 comprises a gNB in wireless communication with a UE. The gNB has a plurality of PDSCH beams, one of which is a default PDSCH beam. A scenario 250 comprises reporting for a default beam amidst an update of the default beam.

For beam reporting with multiple beams, if a UE has already obtained information for the default beam setting (e.g., which one is the default beam), the UE may include the default beam in the beam reporting. Alternatively, the UE may include the default beam in the beam reporting with multiple beams if the quality of the default beam is better than a certain threshold; and if the quality of the default beam is below the threshold, the VE might not include the default beam in the reporting, and it could be viewed as an implicit request to update the default beam setting. The gNB may update the setting of the default beam after receiving the beam reporting and signal back to the UE about the new setting.

In some embodiments, the UE may be configured to report the default beam periodically, or semi-persistently, or aperiodically. The UE may report the beam index of the default beam and L1-RSRP. In order to reduce overhead, the UE may merely report e.g., L1-RSRP for the default beam. After receiving the L1-RSRP of the default beam, the gNB may determine whether the default beam should be updated, and the gNB may signal to the UE information about the default beam if it has been changed.

For some embodiments, for beam reporting with multiple beams, if a UE has already obtained the information for the default beam setting (e.g., which one is the default beam), the UE may include the default beam (a beam index and the beam quality, e.g., L1-RSRP) in some or all of beam reporting instances. After receiving the beam reporting, the gNB may determine whether the default beam should be updated, and the gNB may signal to the UE information about the default beam if it has been changed.

In some embodiments, a UE may include a default beam in beam reporting with multiple beams if the quality of the default beam is better than a certain threshold. If the quality of the default beam is below the threshold, the UE might not include the default beam in the reporting, which could be viewed as an implicit request to update the default beam setting. The gNB may update the setting of the default beam after receiving the beam reporting and may signal back to the UE about the new setting.

If the default beam fails (e.g., if the quality of the default is below a certain threshold), the UE may trigger a beam failure recovery request over PUCCH or Physical Random Access Channel (PRACH) to let the gNB know the status as soon as possible.

In one embodiment, if the default beam fails (e.g., if the quality of the default beam is below a certain threshold), the UE could trigger a beam failure recovery request over PUCCH or PRACH, so that the gNB may update the default beam setting and signal information back to the UE.

Some embodiments may pertain to multiplexing between beam reporting and CSI reporting. Besides beam reporting, a UE may also perform CSI measurement and/or may feedback CSI related information (such as CQI, PMI, RI, and so forth). The CSI information may advantageously be used for scheduling and link adaptation.

When a UE is configured for both beam reporting and CSI reporting, there might be a collision between beam reporting and CSI reporting. In such cases, some mechanisms and methods may advantageously help decide which one may be delivered and which one might be dropped.

In some embodiments, in cases of collision between beam reporting and CSI reporting, one of three options may be used. In a first option, both may be reported. In a second option, beam reporting may be dropped. In a third option, CSI reporting may be dropped. The option to be used may be pre-defined, or configured by higher-layer signaling, or may be determined by reporting content and/or time domain behavior (e.g., periodic reporting, aperiodic reporting, and/or semi-persistent reporting).

In some embodiments, if there is collision between beam reporting and CSI reporting, and if the beam reporting is to change the default beam setting, beam reporting may have priority and CSI reporting may be dropped.

For some embodiments, in cases of collision between beam reporting and CSI reporting, certain priority rules or dropping rules may be defined to drop a beam report, a CSI report, or part of a beam report and/or part of a CSI report. This may also depend on whether periodic, semi-persistent, and/or aperiodic beam report and CSI report collide with each other.

In some embodiments, in cases when beam report and CSI report are carried by PUCCH, when the combined payload size exceeds a maximum code rate which can be supported by the PUCCH, one of the beam report and the CSI report may be dropped.

For some embodiments, a dropping rule or priority rule may be defined as in accordance with Table 6 below. Note that the report in the entries below may be prioritized.

TABLE 6

Example dropping rule or priority rule

|  | aperiodic beam report | semi-persistent beam report | periodic beam report |
|---|---|---|---|
| aperiodic CSI report | aperiodic beam report | aperiodic CSI report | aperiodic CSI report |
| semi-persistent CSI report | aperiodic beam report | semi-persistent beam report | periodic beam report |
| periodic CSI report | aperiodic beam report | semi-persistent beam report | periodic beam report |

In some embodiments, as a further extension, depending on the CSI report content, some part of a CSI report may be dropped in cases of collision with a beam report. For example, CSI reporting and beam reporting may be divided into boxes, where boxes are ordered according to priority. If the combined payload size of CSI report and beam report exceeds a number of bits available for reporting, one or more boxes may be dropped according to priority order. Examples of priority order are presented in FIGS. 3 and 4.

Figure 3:
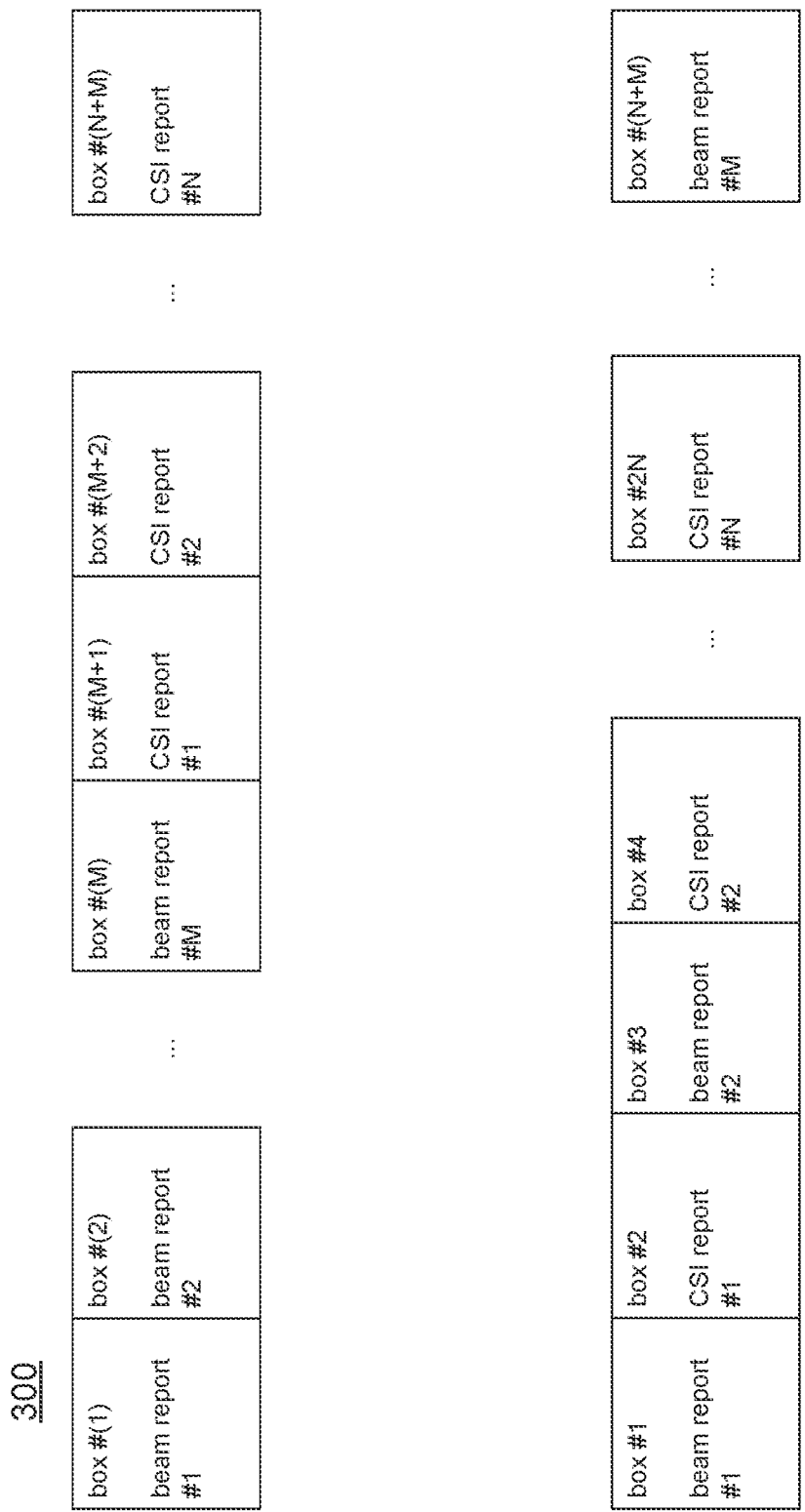
FIG. 3 illustrates scenarios of priority order for Channel State Information (CSI) dropping, in accordance with some embodiments of the disclosure.

FIG. 3 illustrates scenarios of priority order for Channel State Information (CSI) dropping, in accordance with some embodiments of the disclosure. In a first scenario 300, a number M of beam reports may be reported, followed by a number N of CSI reports. In a second scenario 350, a number M of beam reports and a number N of CSI reports may be interlaced.

Figure 4:
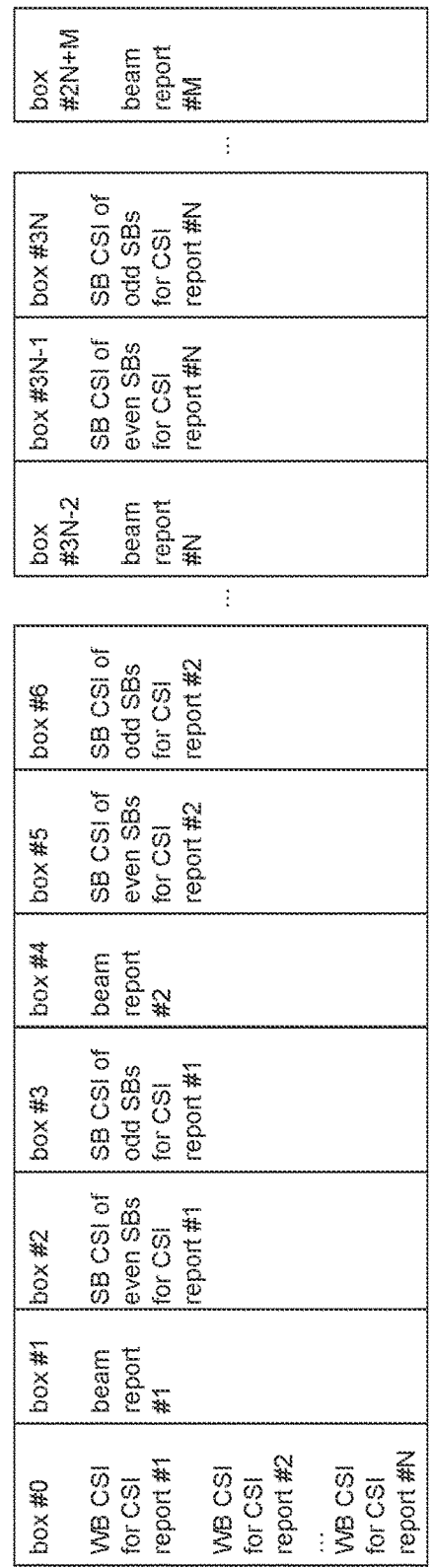
FIG. 4 illustrates scenarios of priority order for CSI dropping for Physical Uplink Shared Channel (PUSCH) based reporting, in accordance with some embodiments of the disclosure.

FIG. 4 illustrates scenarios of priority order for CSI dropping for PUSCH based reporting, in accordance with some embodiments of the disclosure. In various embodiments, beam reporting may be included in a CSI part 2.

In a first scenario 400, a number M of beam reports may be reported, followed by wideband (WB) CSI for a number N of CSI reports; followed by subband (SB) CSI of even SBs for a CSI report number 1, and SB CSI of odd SBs for CSI report number 1; followed by SB CSI of even SBs for a CSI report number 2, and SB CSI of odd SBs for CSI report number 2; and so on, through SB CSI of even SBs for a CSI report number N, and SB CSI of odd SBs for CSI report number N.

In a second scenario 450 WB CSI for a number N of CSI reports may be reported, followed by a beam report number 1, followed by SB CSI of even SBs for a. CSI report number 1, followed by SB CSI of odd SBs for CSI report number 1; followed by a beam report number 2, and SB CSI of even SBs for a CSI report number 2, and SB CSI of odd SBs for CSI report number 2; and so on, through a beam report number N, and SB CSI of even SBs for a CSI report number N, and SB CSI of odd SBs for CSI report number N.

In some embodiments, in NR, the CSI report on PUSCH and/or PUCCH may be divided into two parts, where RI, CRI, and/or CQI for a first codeword may be included in the first CSI part, and another CSI report including PMI may be included in the second CSI part.

For some embodiments, when beam report and CSI report are carried by PUSCH, in one option, beam report may be jointly encoded with the first CSI part. The beam report may be either appended before or after the first CSI part prior to encoding. In some embodiments, beam report may be jointly encoded with the second CSI part. Similarly, the beam report may be either appended before or after the second CSI part prior to encoding.

In some embodiments, some part of a beam report may be jointly encoded with the first CSI part while the remaining part of the beam report may can be jointly encoded with the second CSI part. For example, a beam report for a default beam may be jointly encoded with the first CSI part, and a beam report for other beams may be jointly encoded with the second CSI part.

For some embodiments, since periodic, semi-persistent, and/or aperiodic beam report and CSI report may be supported for NR, certain combination rules may be defined. For example, periodic and semi-persistent beam report and CSI report may be combined in a single report and carried by PUCCH or PUSCH, and aperiodic beam report and CSI report may be combined in a single report and carried by PUCCH or PUSCH. However, aperiodic beam report and periodic and semi-persistent CSI report might not be combined in a single report. Similarly, periodic and semi-persistent beam report and aperiodic CSI report might not be combined in a single report.

In some embodiments, in cases of collision between beam reporting and CSI reporting, if a default beam is to be changed (e.g., the beam quality of the default beam is below a certain threshold), the beam reporting may have priority and the CSI reporting may be dropped.

For some embodiments, in cases of collision between beam reporting and CSI reporting, if there is no need to change the default beam, CSI reporting may have priority and beam reporting may be dropped.

In some embodiments, if beam reporting or CSI reporting is dropped due to a collision, a gNB may schedule aperiodic transmission (e.g., of the dropped reporting) to get the corresponding information.

For some embodiments, if beam reporting is dropped due to the collision, a gNB may schedule aperiodic transmission for beam reporting; and if CSI reporting is dropped, the gNB may schedule aperiodic transmission for CSI reporting delivery.

In some embodiments, considering default beam operation, since a UE may be disposed to receive data over PDSCH from a default beam, CSI information may be reported for the default beam For some embodiments, a UE may always report CSI information for the default PDSCH beam. Alternatively, the UE may be configured to use a default CQI and/or MCS for the data transmission and reception over the default beam.

Some embodiments may pertain to beam reporting when a sub-set of beams fails. When a sub-set of beams fails, a UE may use beam reporting to assist a gNB in updating the beams for a control channel.

In some embodiments, a UE may report a beam quality for good beams (e.g., one or more beams exceeding a quality threshold), and the L1-RSRP for the failed beams might not be reported. For example, if the monitored beams are beam 1 and beam 2, and beam 1 failed, the UE may report a beam quality of beam 2 (as well as some additional beams, if such additional beams exist).

Furthermore, for some embodiments, whether the beam reporting is for beam recovery or for normal beam reporting may be determined by one or more PUCCH time/frequency resources used, and/or may be indicated explicitly in the reporting format. For PUSCH based beam reporting, the normal beam reporting may be assumed.

With respect to a third variety of embodiments, some embodiments may pertain to triggering mechanisms and methods for beam-related information reporting. In various embodiments, PUCCH and PUSCH may be used to convey beam related information reporting. Depending on the specific type of beam related information, various physical channels may be supported. For periodic beam related information reporting, short PUCCH and/or long PUCCH may be used. For semi-persistent beam related information reporting, short PUCCH, long PUCCH, and/or PUSCH can be used. For aperiodic beam related information reporting, short PUCCH and PUSCH can be used.

In various embodiments, triggering mechanisms for beam related information reporting may be provided in various manners.

In some embodiments, one field in Downlink (DL) assignment or UL grant in DCI may be used to trigger aperiodic beam related information reporting. Whether to use short PUCCH or PUSCH for aperiodic beam related information reporting may be configured by Radio Resource Control (RRC) signaling, or may be dynamically indicated in the DCI, or a combination thereof.

For some embodiments, in cases of DL assignment triggering aperiodic beam related information reporting, short PUCCH may be used to carry aperiodic beam related information reporting. Depending on the resources configured for HARQ-ACK feedback and/or beam report, it may be possible that a combined HARQ-ACK feedback and beam report may be carried in a single short PUCCH, or two short PUCCHs carrying HARQ-ACK feedback and beam report may be multiplexed in a Time Division Multiplexing (TDM) manner. Note that a set of resources for short PUCCH transmission may be configured by higher layers via RRC signaling, and one field in the DCI may be used to indicate which resources are used for the transmission of short PUCCH carrying HARQ-ACK feedback and/or beam report.

In some embodiments, in cases of UL grant triggering aperiodic beam related information reporting, short PUCCH or PUSCH may be used to carry aperiodic beam related information reporting. As mentioned herein, whether to use short PUCCH or PUSCH for aperiodic beam related information reporting may be configured by RRC signaling, or may be dynamically indicated in the DCI, or a combination thereof.

Note that for both options, no data state might be indicated by DCI scheduling PDSCH or PUSCH. In these cases, PDSCH scheduled by DL assignment and/or PUSCH scheduled by UL grant might not carry data. For instance, in case of UL grant triggering aperiodic beam related information reporting, depending on the indication in the DCI, no data might be carried by PUSCH. Furthermore, merely beam related information reporting might be carried by PUSCH. Alternatively, some implicit rule may be defined for no data on PUSCH. For example, in cases when the number of PRBs allocated for PUSCH is less than a certain threshold, and when a CSI or beam related information reporting field in the DCI is enabled, merely CSI or beam related information reporting may be carried by PUSCH, and there might be no transport block on PUSCH. Note that the threshold may be predefined in the specification, or may be configured by higher-layer signaling.

For some embodiments, for beam related information reporting, the number of beams, and/or whether beam indices and/or L1-RSRP are included in the report, may be configured by RRC signaling, or may be dynamically indicated in DCI for triggering aperiodic reporting or activation of semi-persistent beam related information reporting, or a combination thereof. Furthermore, whether beam-related information reporting is based on the measurement from a Synchronization Signal Block (SSB) or CSI-RS may be configured by RRC signaling, or may be dynamically indicated in DCI for triggering aperiodic reporting or activation of semi-persistent beam related information reporting, or a combination thereof.

In some embodiments, CSI and beam related information may be jointly or separately triggered and reported by PUCCH or PUSCH. In one option, one field in RRC signaling or in DCI may be used to indicate whether CSI or beam related information is jointly or separately reported. Table 7 below illustrates one example of CSI and beam related information reporting triggering in RRC signaling and/or DCI.

TABLE 7

An example of CSI and beam related information report triggering

| Bit | CSI and beam related information report triggering |
|---|---|
| 00 | not triggered |
| 01 | CSI reporting is triggered |
| 10 | Beam related information reporting is triggered |
| 11 | Both CSI and beam related information reporting are triggered |

Furthermore, beam reporting may have different types. A type 1 may be used for normal beam reporting, and a type 2 may be used for beam failure recovery. The type to be used for periodic beam reporting may be configured by higher-layer signaling. Which type should be used for semi-persistent beam reporting may be configured by higher-layer signaling, or DCI, which could be used to trigger the beam reporting. For aperiodic beam reporting, the type and beam reporting can be indicated jointly or separately. Table 8 below illustrates another example for beam reporting triggering.

TABLE 8

An example of beam related information report triggering

| Bit | CSI and beam related information report triggering |
|---|---|
| 00 | Not triggered |
| 01 | Type 1 Beam related information reporting is triggered |
| 10 | Type 2 Beam related information reporting is triggered |
| 11 | Reserved |

For some embodiments, a beam related information report may carry reporting from multiple Component Carriers (CC). In one option, a CC index for which a UE may report beam related information may be configured by higher layers via RRC signaling, or may be dynamically indicated in DCI for triggering aperiodic reporting or activation of semi-persistent beam related information reporting, or a combination thereof.

In some embodiments, a UE may be configured by higher layers with multiple aperiodic CSI reporting sets (e.g., three sets), where each CSI reporting set may be configured with one or more CSI reporting settings, and each CSI reporting setting may be configured with aperiodic reporting of beam related information (such as CRI and/or L1-RSRP) and/or CSI related information (such as CRI, RI, PMI, and/or CQI). The two or more bits in DCI may indicate one CSI reporting set among multiple sets configured for aperiodic CSI reporting.

For some embodiments, for semi-persistent beam related information reporting, resource allocated for the transmission of short PUCCH, long PUCCH, and/or PUSCH may be configured by RRC signaling. Further, whether to employ short PUCCH, long PUCCH, or PUSCH to convey beam related information reporting may be configured by RRC signaling, or dynamically indicated in the DCI for activation of semi-persistent reporting, or a combination thereof.

In some embodiments, independent resource allocations in time and frequency domain, Demodulation Reference Signal (DM-RS) related configuration for short PUCCH, long PUCCH, and/or PUSCH may be configured by RRC signaling, while one field in DCI for activation of semi-persistent reporting may be used to indicate whether short PUCCH, long PUCCH, or PUSCH is used to convey beam related information reporting.

In some embodiments, the indication of physical channels (e.g., short PUCCH, long PUCCH, and/or PUSCH), corresponding to resource allocations in the time domain and/or the frequency domain, and/or DM-RS related configuration may be configured by RRC signaling.

Furthermore, for some embodiments, periodicity and offset of the transmission of physical channels carrying beam related information reporting may be configured by RRC signaling, or may be dynamically indicated in DCI for activation of semi-persistent beam related information reporting, or a combination thereof. Note that an offset may be configured by higher layers via RRC signaling, which may also depend upon UE capability. For example, a set of values for an offset may be configured by RRC signaling in a UE specific manner, while one field in DCI for activation of semi-persistent beam related information reporting may be used to indicate which one value from a set of values for the offset is applied.

In some embodiments, when PUSCH is configured to carry semi-persistent beam related information reporting, MCS and/or Transport block Size (TBS) may be configured by RRC signaling, or may be dynamically indicated in DCI for activation of semi-persistent beam related information reporting, or a combination thereof.

Note that a Radio Network Temporary Identifier (RNTI) associated with DCI for activation of semi-persistent beam related information reporting may be configured by RRC signaling, or may be Cell-RNTI (C-RNTI) or Semi-Persistent Scheduling RNTI (SPS-RNTI) which may be used for DL or UL SPS scheduling for data transmission. Alternatively, in cases when DCI is used to activate both semi-persistent CSI and beam related information report, RNTI may be defined for SPS-CSI report (e.g., the one which is defined for SPS-CSI report). In yet another option, different RNTIs may be defined for SPS based CSI and beam related information reporting and for data transmission, respectively.

Furthermore, for some embodiments, for DCI deactivation of semi-persistent beam related information report, a UE may feedback HARQ-ACK to indicate successful reception of DCI, For sonic embodiments, a timer based approach can be employed. In cases when the timer is expired, a gNB may assume that semi-persistent beam related information report is successfully deactivated.

Some embodiments may pertain to collision handling for beam-related information reporting. When short PUCCH or long PUCCH carrying beam related information reporting collides with other physical channels and/or signals, certain mechanisms and methods may be defined to advantageously allow a UE to drop one of the physical channels and signals and transmit merely one, which may help to alleviate MID issues at a LTE transmitter. Various embodiments may pertain to collision handling in cases when beam related information reporting collides with other physical channel and signals.

In some embodiments, in cases when beam related information reporting carried by PUCCH collides with other PUCCHs carrying HARQ-ACK feedback, and the combined. UCI information exceeds the payload size or a maximum code rate carried by PUCCH (with short PUCCH or long PUCCH), beam related information report may be dropped, and a UE may merely transmit HARQ-ACK feedback on PUCCH.

For some embodiments, in cases when aperiodic beam related information reporting collides with PUCCHs carrying HARQ-ACK feedback, aperiodic beam related information reporting may be prioritized.

In some embodiments, in cases when beam related information reporting carried by PUCCH collides with other PUCCHs for beam failure recovery, beam related information report may be dropped, and a UE may be disposed to transmit the PUCCH for beam failure recovery, regardless of whether periodic, semi-persistent, and/or aperiodic beam related information report is carried by PUCCH.

For some embodiments, in cases when beam related information reporting carried by PUCCH collides with SRS, certain priority rules can be defined. Table 9 below illustrates one example of a priority rule in case of collision between beam related information reporting and SRS. In the table, PUCCH may be either short. PUCCH or long PUCCH. Further, in case SRS is dropped, dropping can be partial in time domain (e.g., merely those OFDM symbols that collide with PUCCH). Note that this also may apply to the PUCCH with both beam reporting and CSI feedback and/or HARQ-ACK feedback case.

TABLE 9

An example of a priority rule in cases of collision between beam related information reporting and SRS

|  | aperiodic SRS | semi-persistent SRS | periodic SRS |
| --- | --- | --- | --- |
| PUCCH with aperiodic beam report only | not defined | PUCCH | PUCCH |
| PUCCH with semi persistent beam report only | SRS | PUCCH | PUCCH |
| PUCCH with periodic CSI report only | SRS | PUCCH | PUCCH |

In some embodiments, in cases when collision between any of the periodic, aperiodic, and semi-persistent beam reporting happens, one type of beam reporting may be dropped. The dropping rule may be predefined, or configured by higher-layer signaling, or determined by the reporting content (e.g., the beam reporting including the monitored beams for beam failure recovery may have higher priority).

For some embodiments, aperiodic beam related information report may have higher priority than periodic and/or semi-persistent beam related information report. In other words, in cases when periodic and/or semi-persistent beam related information report collides with aperiodic beam related information report, periodic and/or semi-persistent beam related information report may be dropped. This may also apply for cases when periodic, and/or semi-persistent and/or beam related information reports carried by PUSCH collide in time.

In some embodiments, in cases when periodic and semi-persistent beam related information report collides in time, periodic beam related information report may be dropped. Alternatively, semi-persistent beam related information report may be dropped. In another option, whether to drop periodic or semi-persistent beam related information report may be configured by higher layers (e.g., via NR Minimum System Information (MSI), NR Remaining Minimum System Information (RMSI), NR Other System Information (OSI), or RRC signaling.

Furthermore, for some embodiments, beam related information report carried by PUSCH may have higher priority than beam related information report carried by PUCCH.

Figure 5:
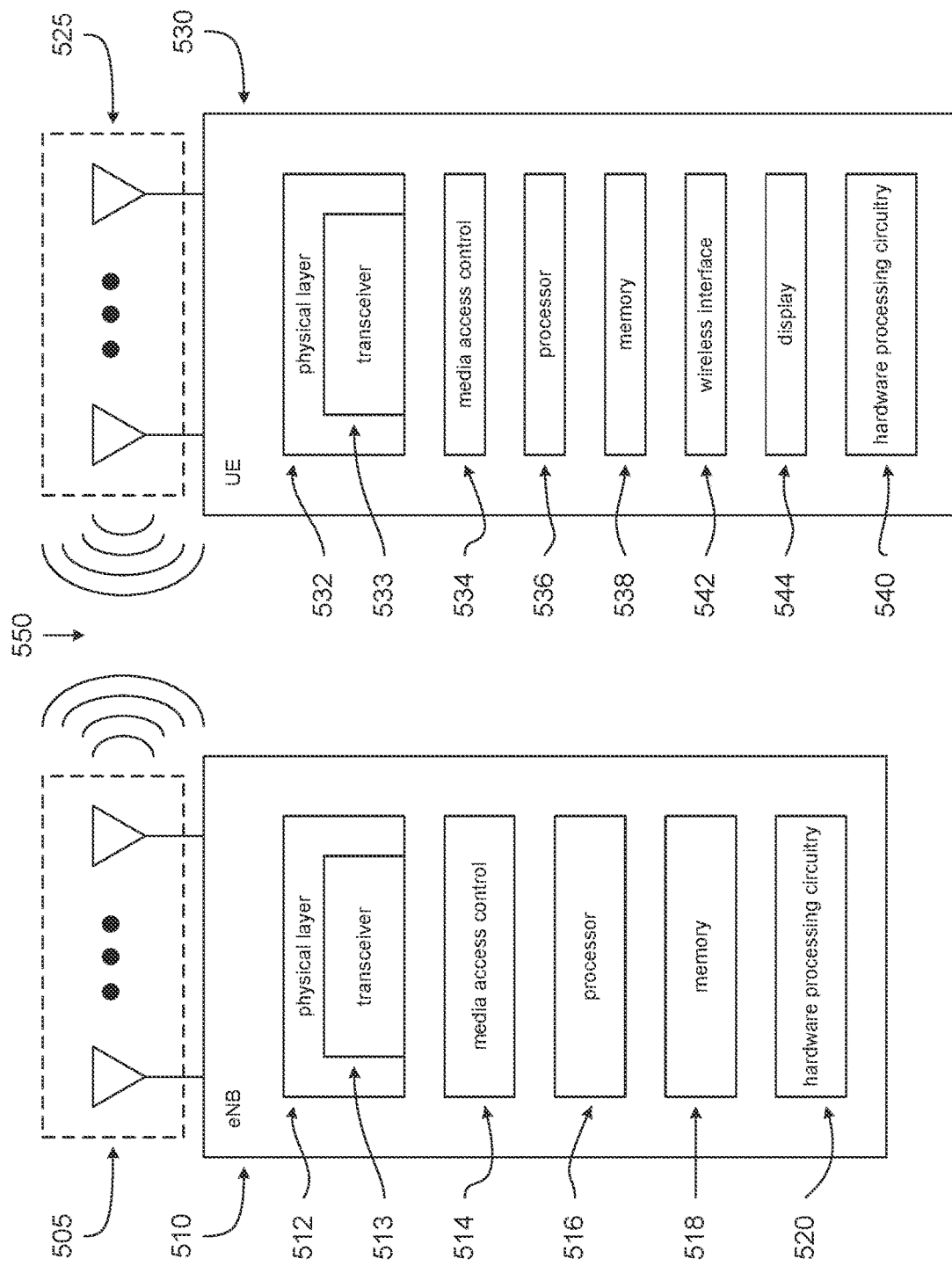
FIG. 5 illustrates an Evolved Node-B (eNB) and a User Equipment, in accordance with some embodiments of the disclosure.

FIG. 5 illustrates an eNB and a UE, in accordance with some embodiments of the disclosure FIG. 5 includes block diagrams of an eNB 510 and a UE 530 which are operable to co-exist with each other and other elements of an LTE network. High-level, simplified architectures of eNB 510 and UE 530 are described so as not to obscure the embodiments. It should be noted that in some embodiments, eNB 510 may be a stationary non-mobile device.

eNB 510 is coupled to one or more antennas 505, and LIE 530 is similarly coupled to one or more antennas 525. However, in some embodiments, eNB 510 may incorporate or comprise antennas 505, and UE 530 in various embodiments may incorporate or comprise antennas 525.

In some embodiments, antennas 505 and/or antennas 525 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 505 are separated to take advantage of spatial diversity.

eNB 510 and UE 530 are operable to communicate with each other on a network, such as a wireless network. eNB 510 and UE 530 may be in communication with each other over a wireless communication channel 550, which has both a downlink path from eNB 510 to UE 530 and an uplink path from UE 530 to eNB 510.

As illustrated in FIG. 5, in some embodiments, eNB 510 may include a physical layer circuitry 512, a MAC (media access control) circuitry 514, a processor 516, a memory 518, and a hardware processing circuitry 520. A person skilled in the art will appreciate that other components not shown may be used in addition to the components shown to form a complete eNB.

In some embodiments, physical layer circuitry 512 includes a transceiver 513 for providing signals to and from UE 530. Transceiver 513 provides signals to and from UEs or other devices using one or more antennas 505. In some embodiments, MAC circuitry 514 controls access to the wireless medium. Memory 518 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 520 may comprise logic devices or circuitry to perform various operations. In some embodiments, processor 516 and memory 518 are arranged to perform the operations of hardware processing circuitry 520, such as operations described herein with reference to logic devices and circuitry within eNB 510 and/or hardware processing circuitry 520.

Accordingly, in some embodiments, eNB 510 may be a device comprising an application processor, a memory, one or more antenna ports, and an interface for allowing the application processor to communicate with another device.

As is also illustrated in FIG. 5, in some embodiments, UE 530 may include a physical layer circuitry 532, a MAC circuitry 534, a processor 536, a memory 538, a hardware processing circuitry 540, a wireless interface 542, and a display 544. A person skilled in the art would appreciate that other components not shown may be used in addition to the components shown to form a complete UE.

In some embodiments, physical layer circuitry 532, includes a transceiver 533 for providing signals to and from eNB 510 (as well as other eNBs). Transceiver 533 provides signals to and from eNBs or other devices using one or more antennas 525. In some embodiments, MAC circuitry 534 controls access to the wireless medium. Memory 538 may be, or may include, a storage media/medium such as a magnetic storage media (e.g., magnetic tapes or magnetic disks), an optical storage media (e.g., optical discs), an electronic storage media e.g., conventional hard disk drives, solid-state disk drives, or flash-memory-based storage media), or any tangible storage media or non-transitory storage media. Wireless interface 542 may be arranged to allow the processor to communicate with another device. Display 544 may provide a visual and/or tactile display for a user to interact with UE 530, such as a touch-screen display. Hardware processing circuitry 540 may comprise logic devices or circuitry to perform various operations. In some embodiments, processor 536 and memory 538 may be arranged to perform the operations of hardware processing circuitry 540, such as operations described herein with reference to logic devices and circuitry within UE 530 and/or hardware processing circuitry 540.

Accordingly, in some embodiments, UE 530 may be a device comprising an application processor, a memory, one or more antennas, a wireless interface for allowing the application processor to communicate with another device, and a touch-screen display.

Elements of FIG. 5, elements of other figures, and/or other elements discussed herein having the same names or reference numbers can operate or function in the manner described herein with respect to any such elements (although the operation and function of such elements is not limited to such descriptions). For example, embodiments of eNBs, hardware processing circuitry of eNBs, LIB, and/or hardware processing circuitry of UEs discussed herein (including the embodiments depicted in FIGS. 6 and 7) can operate or function in the manner described herein with respect to any of the figures.

In addition, although eNB 510 and UE 530 are each described as having several separate functional elements, one or more of the functional elements may be combined, and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

With reference to FIG. 5, a UE may include various hardware processing circuitries discussed herein, which may in turn comprise logic devices and/or circuitry operable to perform various operations. For example, in FIG. 5, UE 530 (or various elements or components therein, such as hardware processing circuitry 540, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 536 (and/or one or more other processors which UE 530 may comprise), memory 538, and/or other elements or components of LE 530 (which may include hardware processing circuitry 540) may be arranged to perform the operations of these hardware processing circuitries, such as operations described herein with reference to devices and circuitry within these hardware processing circuitries. In some embodiments, processor 536 (and/or one or more other processors which UE 530 may comprise) may be a baseband processor.

With respect to a variety of embodiments, an apparatus of UE 530 (or another UE or mobile handset), which may be operable to communicate with one or more eNBs on a wireless network, may comprise a hardware processing circuitry. In some embodiments, the hardware processing circuitry may comprise one or more antenna ports operable to provide various transmissions over a wireless communication channel (such as wireless communication channel 550). The antenna ports may be coupled to one or more antennas (which may be antennas 525). In some embodiments, the hardware processing circuitry may incorporate the antennas, while in other embodiments, the hardware processing circuitry may merely be coupled to the antennas.

The antenna ports and the antennas may be operable to provide signals from a UE to a wireless communications channel and/or an eNB, and may be operable to provide signals from an eNB and/or a wireless communications channel to a UE. For example, the antenna ports and the antennas may be operable to provide transmissions from UE 530 to wireless communication channel 550 (and from there to eNB 510, or to another eNB). Similarly, the antennas and the antenna ports may be operable to provide transmissions from a wireless communication channel 550 (and beyond that, from eNB 510, or another eNB) to UE 530.

The hardware processing circuitry may comprise various circuitries operable in accordance with the various embodiments discussed herein. The hardware processing circuitry may comprise a first circuitry and/or a second circuitry. The first circuitry may be operable to process a DL transmission carrying one or more PT-RSes. The second circuitry may be operable to generate a LI transmission carrying an LI based at least on a number of PT-RS APs associated with the PT-RSes. The hardware processing circuitry may also comprise an interface for receiving the transmission from a receiving circuitry and for sending the LI, transmission to a transmission circuitry.

In some embodiments, the UL transmission may be a PUCCH transmission. For some embodiments, when the number of PT-RS APs may be one, the LI may be jointly encoded with one or more of a CRI, an RI, a PMI, or a CQI. For some embodiments, a number of the LI may be equal to the number of PT-RS APs. In some embodiments, the LI may be jointly encoded with one or more of a CRT, an RI, a PMI, or a CQI.

For some embodiments, the UL transmission may be a PUSCH transmission. In some embodiments, when the number of PT-RS APs is one, the LI may be jointly encoded with one of a CRI, an RI, a first CQI, a PMI, or a second CQI. For some embodiments, a number of the LI may be equal to the number of PT-RS APs, and the LI may be jointly encoded with one of a CRI, an RI, a first CQI, a PMI, or a second CQI.

In some embodiments, the first circuitry and/or the second circuitry may be implemented as separate circuitries. In other embodiments, the first circuitry and/or the second circuitry may be combined and implemented together in a circuitry without altering the essence of the embodiments.

With reference to FIG. 5, methods that may relate to UE 530 and hardware processing circuitry 540 are discussed herein. Although the actions described herein may be described in a particular order, the order of the actions can be modified. Thus, in various embodiments, the actions can be performed in a different order, and some actions may be performed in parallel. Some of the actions and/or operations are optional in accordance with certain embodiments. Additionally, operations from the various flows may be utilized in a variety of combinations.

Moreover, in some embodiments, machine readable storage media may have executable instructions that, when executed, cause UE 530 and/or hardware processing circuitry 540 to perform an operation comprising the methods discussed herein. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods discussed herein.

With respect to a variety of embodiments, various methods may be in accordance with the various embodiments discussed herein. A method may comprise a processing and a generating. In the processing, a DL transmission carrying one or more PT-RSes may be processed. In the generating, a UL transmission carrying an LI based at least on a number of PT-RS APs associated with the PT-RSes may be generated.

In some embodiments, the UL transmission may be a PUCCH transmission. For some embodiments, when the number of PT-RS APs may be one, the LI may be jointly encoded with one or more of a CRI, an RI, a PMI, or a CQI. For some embodiments, a number of the LI may be equal to the number of PT-RS APs. In some embodiments, the LI may be jointly encoded with one or more of a CRI, an RI, a PMI or a CQI.

For some embodiments, the UL transmission may be a PUSCH transmission. In some embodiments, when the number of PT-RS APs is one, the LI may be jointly encoded with one of a CRI, an ISI, a first CQI, a PMI, or a second CQI, For some embodiments, a number of the LI may be equal to the number of PT-RS APs, and the LI may be jointly encoded with one of a CRI, an RI, a first CQI, a PMI, or a second CQI.

Figure 6:
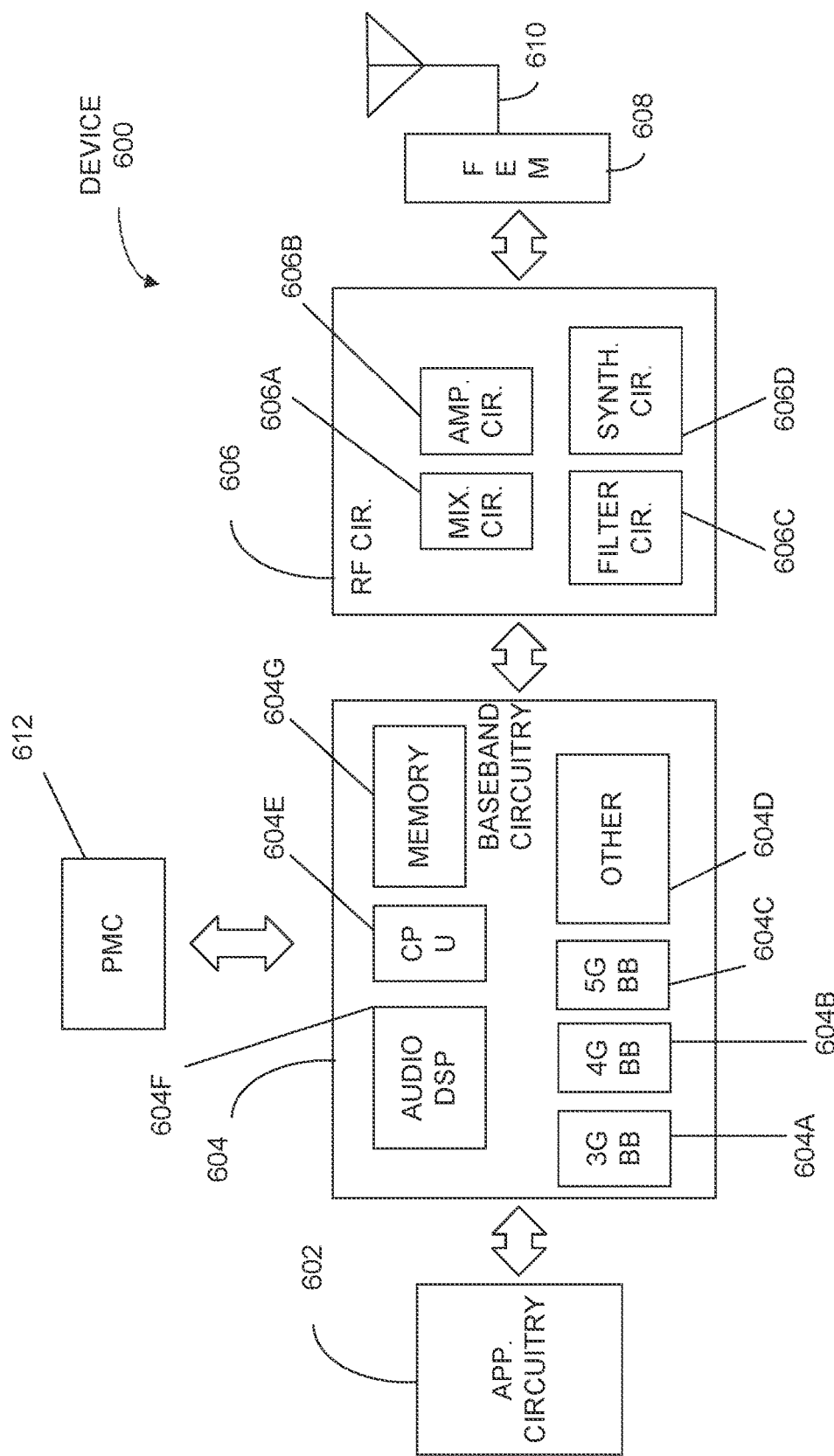
FIG. 6 illustrates example components of a device, in accordance with some embodiments of the disclosure.

FIG. 6 illustrates example components of a device, in accordance with some embodiments of the disclosure. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a LIE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RE circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), and so on). The baseband circuitry 604 (e.g., one or more of baseband processors 604A-D) may handle various radio control functions that enable communication with one or more radio networks via the RE circuitry 606. In other embodiments, some or all of the functionality of baseband processors 604A-D may be included in modules stored in the memory 6041 and executed via a Central Processing Unit (CPU) 604E. The radio control functions may include, but are not limited to, signal modulation/demodulation, encoding/decoding, radio frequency shifting, and so on. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RE circuitry 606 may include switches, filters, amplifiers, and so on to facilitate the communication with the wireless network. RF circuitry 606 may include a receive signal path which may include circuitry to down-convert RE signals received from the FEIN circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606A, amplifier circuitry 606B and filter circuitry 6060. In some embodiments, the transmit signal path of the RE circuitry 606 may include filter circuitry 6060 and mixer circuitry 606A. RF circuitry 606 may also include synthesizer circuitry 606D for synthesizing a frequency for use by the mixer circuitry 606A of the receive signal path and the transmit signal path. In some embodiments, the mixer circuitry 606A of the receive signal path may be configured to down-convert RE signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by filter circuitry 606C.

In some embodiments, the mixer circuitry 606A of the receive signal path and the mixer circuitry 606A of the transmit signal path may include two or more mixers and may be arranged for quadrature downconversion and upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A of the transmit signal path may be arranged for direct downconversion and direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606D may be a fractional-N synthesizer or a fractional N/N+1 synthesizer, although the scope of the embodiments is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606D of the RE circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RE signals received from one or more antennas 610, amplify the received signals and provide the amplified versions of the received signals to the RE circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RE signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, and so on. The device 600 goes into a very low power state and it performs paging where again it periodically wakes up to listen to the network and then powers down again. The device 600 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PEW) layer of a UE/RAN node, described in further detail below.

Figure 7:
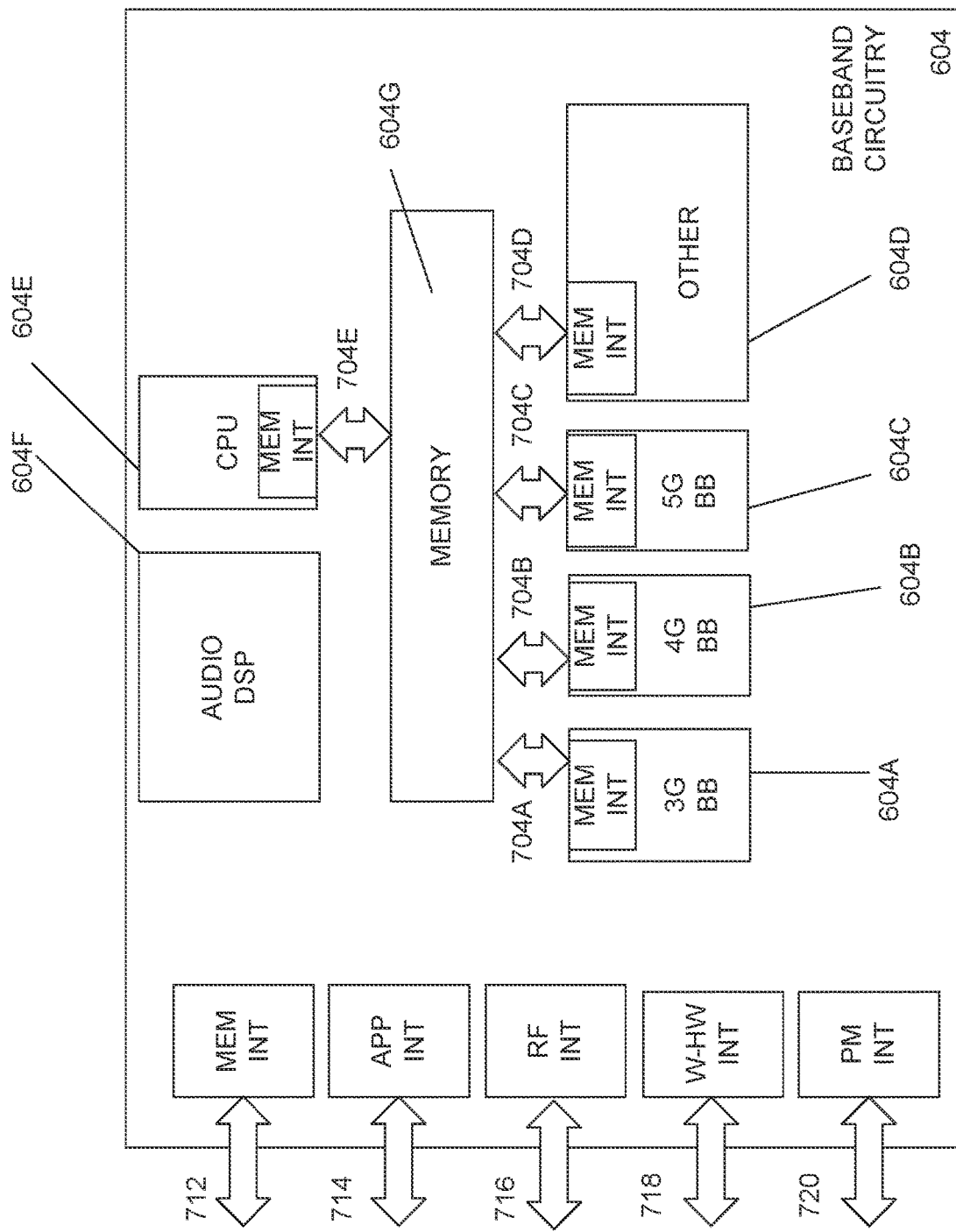
FIG. 7 illustrates example interfaces of baseband circuitry, in accordance with some embodiments of the disclosure.

FIG. 7 illustrates example interfaces of baseband circuitry, in accordance with some embodiments of the disclosure. As discussed above, the baseband circuitry 604 of FIG. 6 may comprise processors 604A-604E and a memory 604G utilized by said processors. Each of the processors 604A-

604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612).

It is pointed out that elements of any of the Figures herein having reference numbers and/or names that correspond with reference numbers and/or names of any other Figure herein may, in various embodiments, operate or function in a manner similar to those corresponding elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact, that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: process a Downlink (DL) transmission carrying one or more Phase Tracking Reference Signal (PT RSes); and generate an Uplink (UL) transmission carrying a Layer Indicator (LI) based at least on a number of PT RS Antenna. Ports (APs) associated with the PT RSes, and an interface for receiving the DL transmission from a receiving circuitry and for sending the UL transmission to a transmission circuitry.

In example 2, the apparatus of example 1, wherein the UL transmission is a Physical Uplink Control Channel (PUCCH) transmission.

In example 3, the apparatus of example 2, wherein, when the number of PT RS APs is one, the LI is jointly encoded with one or more of a CSI-RS Resource Indicator (CRI), a Rank Indicator (RI), a Precoder Matrix Indicator (PMI), or a Channel Quality Indicator (CQI).

In example 4, the apparatus of example 2, wherein a number of the LI is equal to the number of PT RS APs.

In example 5, the apparatus of example 4, wherein the LI is jointly encoded with one or more of a CSI-RS Resource Indicator (CRI), a Rank Indicator (RI), a Precoder Matrix Indicator (PMI), or a Channel Quality Indicator (CQI).

In example 6, the apparatus of any of examples 1 through 5, wherein the UL transmission is a Physical Uplink Shared Channel (PUSCH) transmission.

In example 7, the apparatus of example 6, wherein, when the number of PT RS APs is one, the LI is jointly encoded with one of a CSI-RS Resource indicator (CM), a Rank indicator (RI), a first Channel Quality Indicator (CQI), a Precoder Matrix Indicator (PMI), or a second CQI.

In example 8, the apparatus of example 6, wherein a number of the LI is equal to the number of PT RS APs; and wherein the LI is jointly encoded with one of a CSI-RS Resource Indicator (CRI), a Rank Indicator (RI), a first Channel Quality Indicator (CQI), a Precoder Matrix Indicator (PMI), or a second CQI.

Example 9 provides machine readable storage media having machine executable instructions that, when executed, cause one or more processors of a User Equipment (UE) operable to communicate with an Evolved Node-B (eNB) on a wireless network to perform an operation comprising: process a Downlink (DL) transmission carrying one or more Phase Tracking Reference Signal (PT RSes); and generate an Uplink (UL) transmission carrying a Layer Indicator (LI) based at least on a number of PT RS Antenna Ports (APs) associated with the PT RSes.

In example 10, the machine readable storage media of example 9, wherein the UL transmission is a Physical Uplink Control Channel (PUCCH) transmission.

In example 11, the machine readable storage media of example 10, wherein, when the number of PT RS APs is one, the LI is jointly encoded with one or more of a CSI-RS Resource Indicator (CRI), a Rank Indicator (RI), a Precoder Matrix Indicator (PMI), or a Channel Quality Indicator (CQI).

In example 12, the machine readable storage media of example 10, wherein a number of the LI is equal to the number of PT RS APs.

In example 13, the machine readable storage media of example 12, wherein the is jointly encoded with one or more of a CSI-RS Resource Indicator (CRI), a Rank indicator (RI), a Precoder Matrix Indicator (PMI), or a Channel Quality Indicator (CQI).

In example 14, the machine readable storage media of any of examples 9 through 13, wherein the UL transmission is a Physical Uplink Shared Channel (PUSCH) transmission.

In example 15, the machine readable storage media of example 14, wherein, when the number of PT RS APs is one, the LI is jointly encoded with one of a CSI-RS Resource Indicator (CRI), a Rank Indicator (RI), a first Channel Quality Indicator (CQI) a Precoder Matrix Indicator (PMI), or a second CQI.

In example 16, the machine readable storage media of example 14, wherein a number of the LI is equal to the number of PT RS APs; and wherein the LI is jointly encoded with one of a CSI-RS Resource Indicator (CRI), a Rank Indicator (RI), a first Channel Quality Indicator (CQI), a Precoder Matrix Indicator (PMI), or a second. CQI.

Example 17 provides a User Equipment (UE) device comprising a memory, one or more antennas, a wireless interface for allowing the application processor to communicate with another device, a touch-screen display, and one or more processors to: process a Downlink (DL) transmission carrying one or more Phase Tracking Reference Signal (PT RSes); and generate an Uplink (UL) transmission carrying a Layer Indicator (LI) based at least on a number of PT RS Antenna Ports (APs) associated with the PT RSes, and an interface for receiving the DL transmission from a receiving circuitry and for sending the UL transmission to a transmission circuitry.

In example 18, the apparatus of example 17, wherein the UL transmission is a Physical Uplink Control Channel (PUCCH) transmission; and wherein, when the number of PT RS APs is one, the LI is jointly encoded with one or more of a CSI-RS Resource indicator (CRI), a Rank Indicator (RI) a Precoder Matrix Indicator (PMI), or a Channel Quality Indicator (CQI).

In example 19, the apparatus of any of examples 17 through 18, wherein the UL transmission is a Physical Uplink Control Channel (PUCCH) transmission; wherein a number of the LI is equal to the number of PT RS APs; and wherein the LI is jointly encoded with one or more of a CSI-RS Resource Indicator (CRI), a Rank indicator (RI), a Precoder Matrix Indicator (PMI), or a Channel Quality Indicator (CQI).

In example 20, the apparatus of any of examples 17 through 19, wherein the UL transmission is a Physical Uplink Shared Channel (PUSCH) transmission; and wherein, when the number of PT RS APs is one, the LI is jointly encoded with one of a CSI-RS Resource Indicator (CRI), a Rank Indicator (RI), a first Channel Quality Indicator (CQI), a Precoder Matrix Indicator (PMI), or a second CQI.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory computer-readable medium storing instructions that, when executed by one or more processors of a User Equipment (UE), cause the UE to perform operations comprising:
processing a Downlink (DL) transmission carrying one or more Phase Tracking Reference Signals (PT-RSes); and
generating an Uplink (UL) transmission carrying one or more Layer Indicators (LIs) together with an associated Channel State Information (CSI) based at least on a number of PT-RS Antenna Ports (APs) associated with the one or more PT-RSes, wherein a PT-RS of the one or more PT-RSes is associated with an AP of a Demodulation Reference Signal (DMRS) AP group, wherein a number of the one or more LIs is equal to the number of PT-RS APs, and the number of the one or more LIs is jointly encoded with one or more of a CSI Resource Indicator (CRI), a Rank Indicator (RI), a Precoder Matrix Indicator (PMI), or a Channel Quality Indicator (CQI).

2. The non-transitory computer-readable medium of claim 1, wherein the UL transmission comprises a Physical Uplink Control Channel (PUCCH) transmission.

3. The non-transitory computer-readable medium of claim 2, wherein the one or more LIs is reported with the associated CSI via a short PUCCH transmission or a long PUCCH transmission.

4. The non-transitory computer-readable medium of claim 1, wherein the one or more LIs has a varying size dependent on a value of the RI.

5. The non-transitory computer-readable medium of claim 1, wherein the number of PT-RS APs is one.

6. The non-transitory computer-readable medium of claim 1, wherein a first LI of the number of the one or more LIs is encoded with at least a padding to have a first encoded size equal to a second encoded size for a second LI of the number of the one or more LIs.

7. The non-transitory computer-readable medium of claim 1, wherein the UL transmission comprises a Physical Uplink Shared Channel (PUSCH) transmission, and wherein the associated CSI comprises a first Channel Quality Indicator (CQI) and a second CQI.

8. The non-transitory computer-readable medium of claim 7, wherein the number of PT-RS APs is one, the one or more LIs is jointly encoded with one of the CRI, the RI, the first CQI, the PMI, or the second CQI.

9. The non-transitory computer-readable medium of claim 7, wherein the number of the one or more LIs are jointly encoded with one of the CRI, the RI, the first CQI, the PMI, or the second CQI.

10. A User Equipment (UE), comprising:
a memory; and
one or more processors communicatively coupled to the memory, and configured to:
process a Downlink (DL) transmission carrying one or more Phase Tracking Reference Signal (PT-RSes); and
generate an Uplink (UL) transmission carrying one or more Layer Indicators (LIs) together with an associated Channel State Information (CSI) based at least on a number of PT-RS Antenna Ports (APs) associated with the one or more PT-RSes, wherein a PT-RS of the one or more PT-RSes is associated with an AP of a Demodulation Reference Signal (DMRS) AP group, wherein a number of the one or more LIs is equal to the number of PT-RS APs, and the number of the one or more LIs is jointly encoded with one or more of a CSI Resource Indicator (CRI), a Rank Indicator (RI), a Precoder Matrix Indicator (PMI), or a Channel Quality Indicator (CQI).

11. The UE of claim 10, wherein the UL transmission comprises a Physical Uplink Control Channel (PUCCH) transmission.

12. The UE of claim 11, wherein the one or more LIs is reported with the associated CSI via a short PUCCH transmission or a long PUCCH transmission.

13. The UE of claim 10, wherein the one or more LIs has a varying size dependent on a value of the RI.

14. The UE of claim 10, wherein the number of PT-RS APs is one.

15. The UE of claim 10, wherein the UL transmission comprises a Physical Uplink Shared Channel (PUSCH) transmission, and wherein the associated CSI comprises a first Channel Quality Indicator (CQI) and a second CQI.

16. The UE of claim 15, wherein, when the number of PT-RS APs is one, the one or more LIs is jointly encoded with one of the CRI, the RI, the first CQI, the PMI, or the second CQI.

17. A method performed by a User Equipment (UE), comprising:
processing a Downlink (DL) transmission carrying one or more Phase Tracking Reference Signal (PT-RSes); and
generating an Uplink (UL) transmission carrying one or more Layer Indicators (LIs) together with an associated Channel State Information (CSI) based at least on a number of PT-RS Antenna Ports (APs) associated with the one or more PT-RSes, wherein a PT-RS of the one or more PT-RSes is associated with an AP of a Demodulation Reference Signal (DMRS) AP group, wherein a number of the one or more LIs is equal to the number of PT-RS APs, and the number of the one or more Lis is jointly encoded with one or more of a CSI Resource Indicator (CRI), a Rank Indicator (RI), a Precoder Matrix Indicator (PMI), or a Channel Quality Indicator (CQI).

18. The method of claim 17, wherein the UL transmission comprises a Physical Uplink Control Channel (PUCCH) transmission, and wherein the one or more LIs is reported with the associated CSI via a short PUCCH transmission or a long PUCCH transmission.

19. The method of claim 17, wherein the UL transmission comprises a Physical Uplink Shared Channel (PUSCH) transmission, and wherein the associated CSI comprises a first Channel Quality Indicator (CQI) and a second CQI.

* * * * *